United States Patent
Sitalasai et al.

(10) Patent No.: US 6,877,919 B2
(45) Date of Patent: Apr. 12, 2005

(54) FOLDABLE KEYBOARD

(75) Inventors: Chatree Sitalasai, La Crescenta, CA (US); Toshisada Takeda, Simi Valley, CA (US); Richard Acosta, Newbury Park, CA (US); Casey Peterson, Saugus, CA (US); Charles Fauble, Canyon Country, CA (US)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 10/357,229

(22) Filed: Feb. 3, 2003

(65) Prior Publication Data

US 2004/0151527 A1 Aug. 5, 2004

(51) Int. Cl.[7] ................................................ B41J 5/08
(52) U.S. Cl. ...................................... 400/472; 400/691
(58) Field of Search ........................ 400/472, 691; 341/22, 21; 361/680; 345/168, 169

(56) References Cited

U.S. PATENT DOCUMENTS

| | | | |
|---|---|---|---|
| 5,502,460 A | * | 3/1996 | Bowen ........................ 345/168 |
| 5,712,760 A | | 1/1998 | Coulon et al. .............. 361/680 |
| 5,733,056 A | * | 3/1998 | Meagher ..................... 400/472 |
| 5,841,635 A | | 11/1998 | Sadler et al. ............... 361/749 |
| 5,941,648 A | | 8/1999 | Robinson et al. ............. 400/82 |
| 6,081,207 A | | 6/2000 | Batio .......................... 341/20 |
| 6,151,012 A | | 11/2000 | Bullister ..................... 345/768 |
| 6,174,097 B1 | | 1/2001 | Daniel ........................ 400/472 |
| 6,256,017 B1 | | 7/2001 | Bullister ..................... 345/168 |
| 6,674,636 B2 | * | 1/2004 | Loo ........................... 361/680 |
| 6,734,809 B1 | * | 5/2004 | Olodort et al. .............. 341/22 |
| 2002/0054779 A1 | * | 5/2002 | Hsu et al. .................. 400/472 |

* cited by examiner

Primary Examiner—Anthony H. Nguyen
(74) Attorney, Agent, or Firm—Joel Lutzker; John C. Garces; Schulte Roth & Zabel LLP

(57) ABSTRACT

A portable foldable keyboard comprised of two housings, each of which contains a key assembly, and a central hinge. The two housings can be slid together when the keyboard is unfolded and they interlock to form a sturdy keyboard having the standard QWERTY keyswitch layout.

10 Claims, 5 Drawing Sheets

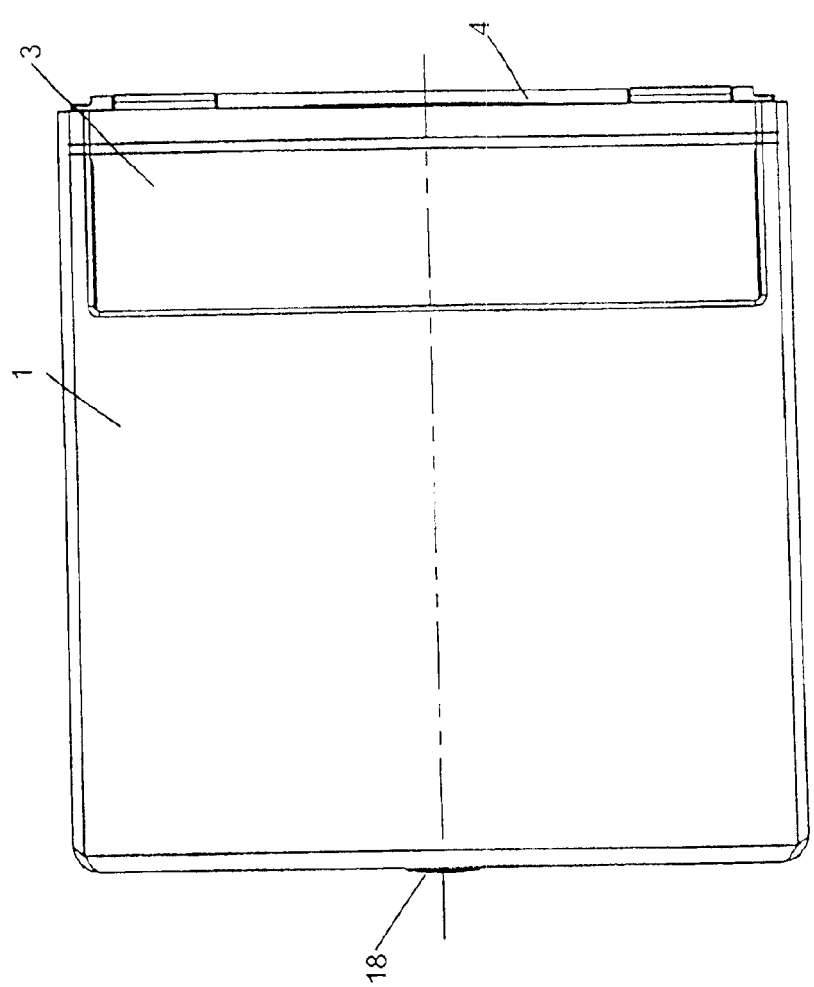
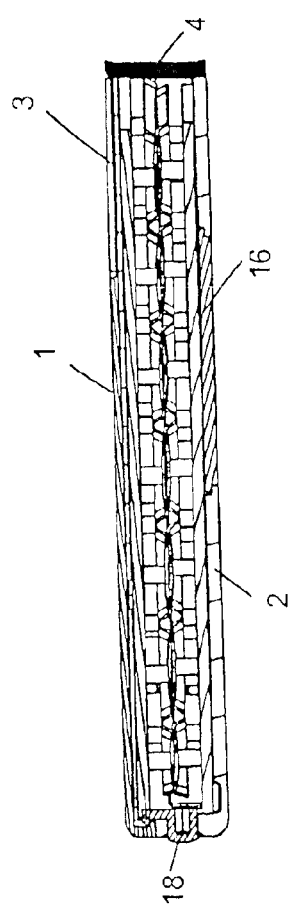

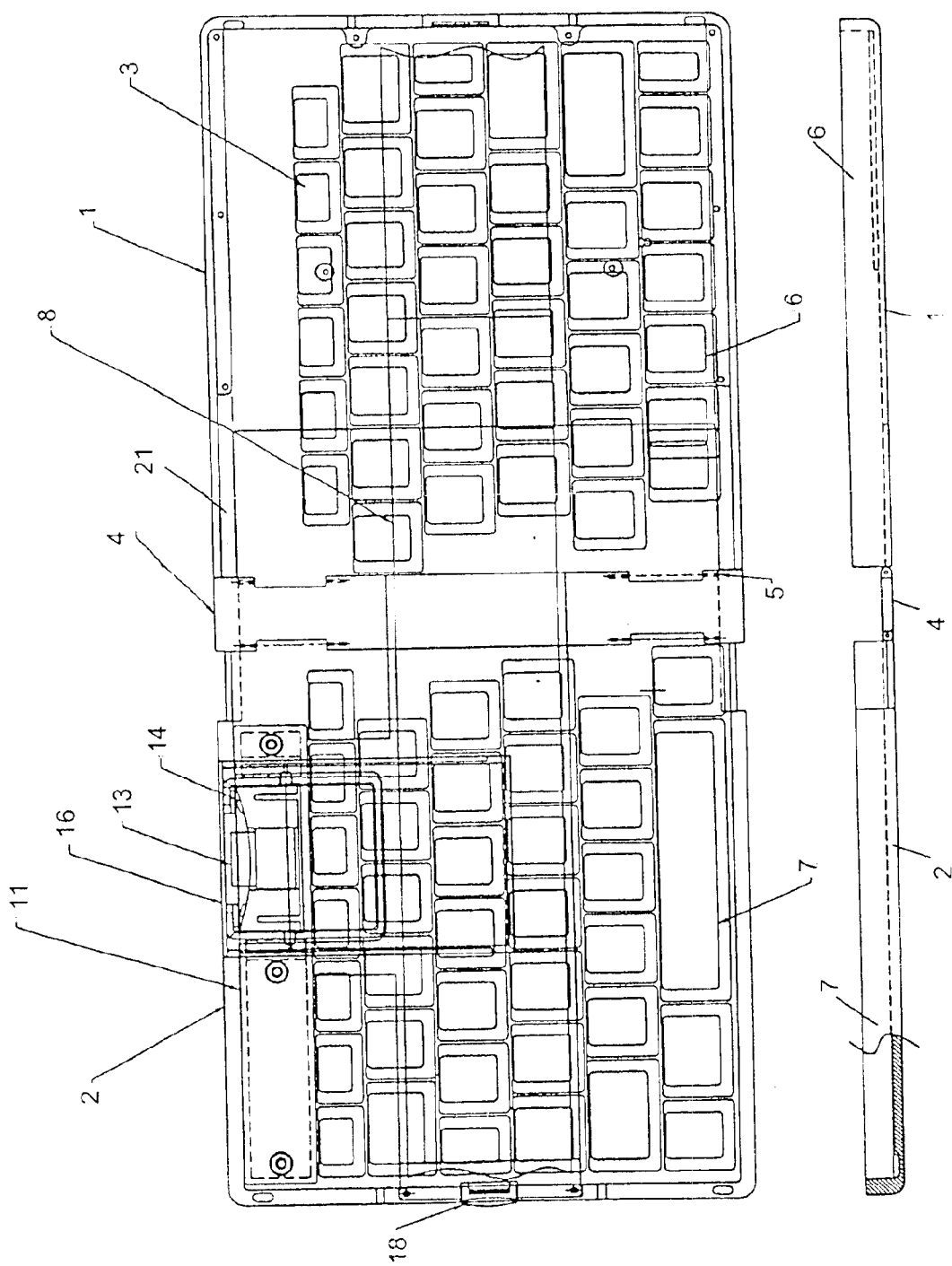

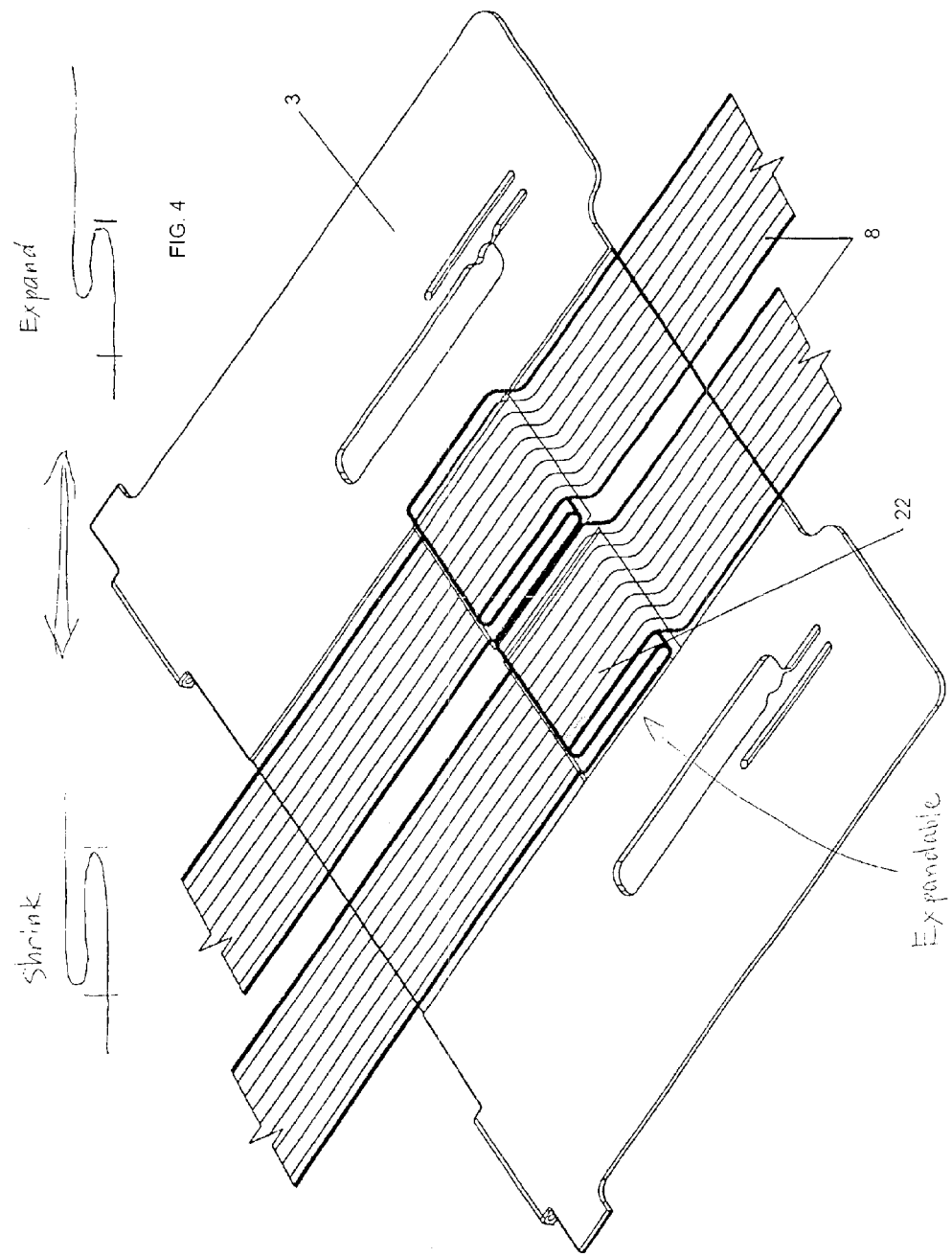

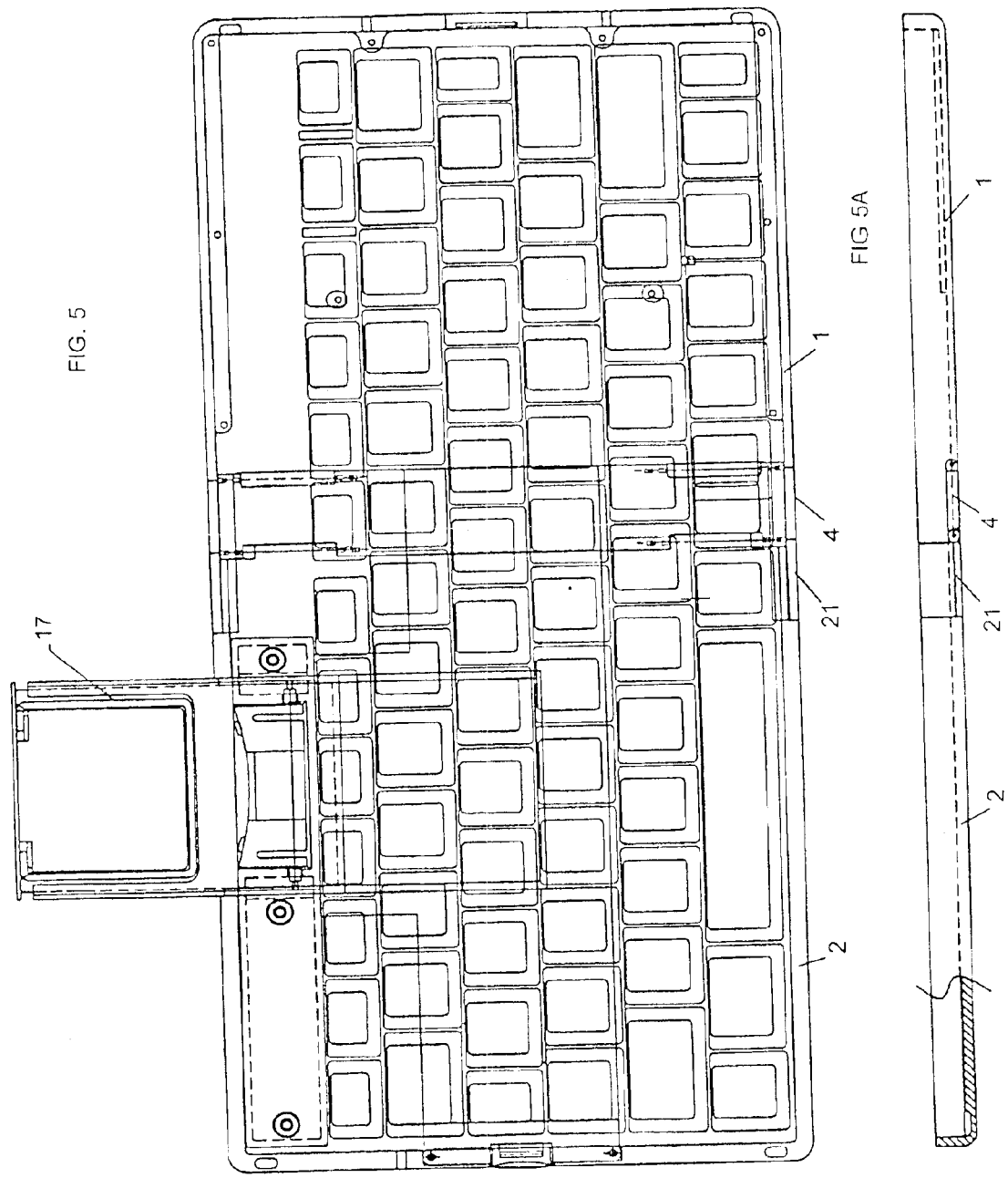

FOLDABLE KEYBOARD

BACKGROUND OF THE INVENTION

The present invention relates to a foldable keyboard, and more particularly to a foldable keyboard that is easy to manufacture and that is sufficiently rigid when unfolded such that it can be utilized while it is positioned on a user's lap. Keyboards embodying this invention are particularly useful when combined with personal data assistants ("PDAs").

DESCRIPTION OF RELATED ART

The need exists for a PDA sized, efficient, low cost portable keyboard. Although several versions of foldable or portable keyboards, which are useable with PDAs, have been patented or introduced into the market, none of the existing keyboards satisfy the need for a PDA sized, efficient, low cost portable keyboard. Each of the existing keyboards exhibits one or more of the following drawbacks: they are substantially larger than a PDA even when folded; their unfolded length extends substantially beyond the useable keyswitch area; the keyswitch layouts do not comply with the standard QWERTY keyswitch layout used by most U.S. keyboards; they are overly complex and consist of many parts; and they lack sufficient rigidity for efficient lap-top use.

For example, U.S. Pat. No. 5,941,648, discloses a foldable keyboard that can be used with a PDA. The keyboard disclosed in U.S. Pat. No. 5,941,648 is divided into curved halves connected together by a single hinge. When this prior art keyboard is unfolded for use, its keyswitch layout is not in conformance with the standard QWERTY keyswitch layout. Additionally, it is not sufficiently rigid to be typed on when in a user's lap. Further, the keyboard disclosed in U.S. Pat. No. 5,941,648 is substantially larger than a PDA even when it is folded The Stowaway Portable Keyboard, which is sold by Think Outside, Inc., discloses a foldable keyboard having four segments connected together by three hinges. Each segment is comprised of a housing and a keyswitch assembly. When the Stowaway Portable Keyboard is unfolded a gap exists between the keys on the first segment of the keyboard and the keys on the second segment and a gap exists between the keys on the third segment of the keyboard and the keys on the fourth segment. The keyswitch assemblies may be slid together to close the gaps between the keys and to place the keyswitches into the standard QWERTY keyswitch layout. However, the housings are not slid together. Accordingly, a substantial amount of unused space exists on the outer sides of the first segment of the keyboard and the second segment of the keyboard making the keyboard unnecessarily long. Additionally, a keyboard having four segments and three hinges is difficult to manufacturer and requires a large number of parts, which results in a high manufacturing cost.

SUMMARY OF THE INVENTION

Embodiments of this invention provide an efficient, low cost portable keyboard that can be used with a PDA as well as other portable microprocessor based equipment. The preferred embodiment of this invention is a keyboard separated into two halves, which can be folded together when the keyboard is not in use. When the keyboard is folded, the keyboard is approximately the size of a PDA and it can be carried in a user's pocket. When the keyboard is unfolded, the two halves can be slid together using a unique sliding interlock mechanism. This unique sliding interlock mechanism, which requires only a few parts and is easy to manufacture, allows the two keyboard halves to form a single keyboard that does not flex in the middle and that has a sturdiness similar to that of a one piece keyboard. Additionally, when the two halves of the keyboard are slid together, the keyboard's keyswitches are in a standard QWERTY keyswitch layout and the width of the keyboard does not extend beyond the useable keyswitch area.

Additionally, the preferred embodiment of this invention utilizes a key membrane cable, which transmits electrical signals from the keyswitches, that utilizes a folded region to facilitate sliding the two keyboard halves together and apart.

Further, the preferred embodiment of this invention utilizes a PDA connector that automatically pops up when the keyboard is unfolded to facilitate connecting a PDA to the keyboard.

These and other objects, features, and advantages of the present invention will become more apparent in light of the following detailed description and accompanying drawings.

BRIEF DESCRIPTION OF THE DRAWINGS

The present invention will be more easily understood with reference to the following drawings.

FIG. 2 is a is a top view of the preferred embodiment of the present invention in its closed condition.

FIG. 2A is a side view of the preferred embodiment of the present invention in its closed condition.

FIG. 3 is a top view of the preferred embodiment of the present invention in its open non-interlocked position.

FIG. 3A is a side view of the preferred embodiment of the present invention in its open non-interlocked position.

FIG. 4 is a top view of a hinge plate used in the preferred embodiment of the present invention showing two key membrane cables.

FIG. 5 is a top view of the preferred embodiment of the present invention in its open interlocked position.

FIG. 5A is a side view of the preferred embodiment of the present invention in its open interlocked position.

DETAILED DESCRIPTION OF THE PREFERRED EMBODIMENT

Figure 1:
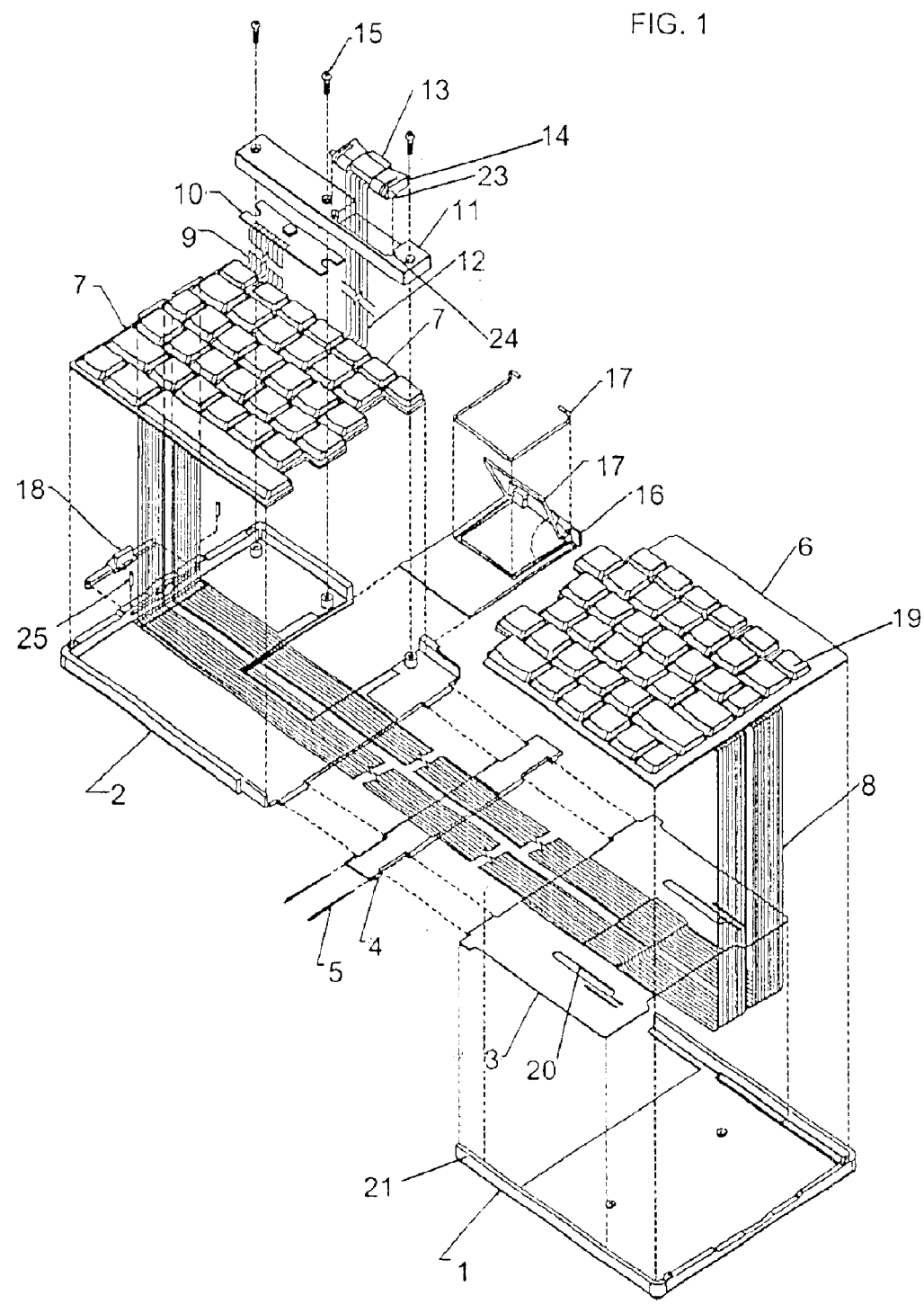
FIG. 1 is an exploded top view of the preferred embodiment of the present invention.

A description of a preferred embodiment of the present invention will now be given.

FIG. 1 shows an exploded top view of a keyboard embodying the present invention. The keyboard is comprised of a right housing 1, a left housing 2, a right hinge plate 3, a center hinge 4, hinge pins 5, right key assembly 6, left key assembly 7, key membrane cable 8, PCB membrane cable 9, PCB 10, PCB housing 11, PDA membrane cable 12, PDA connector 13, PDA connector holder 14, screws 15, PDA support 16, PDA support wire 17, and locking latch 18.

Right hinge plate 3 is positioned in right housing 1 and right key assembly 6 is positioned above right hinge plate 3 in right housing 1. Screws 15, which are inserted from the bottom of right housing 1, pass through elongated openings 20 in hinge plate 3 and into right key assembly 6. Left key assembly 7 is inserted into left housing 2 and affixed thereto through the use of screws 15. Center hinge 4 is connected to right hinge plate 3 and left housing 2 through the use of four hinge pins 5. Locking latch 18 is affixed to the outer side of left housing 2 through the use of two pins 25. PDA support 16 is slidably inserted into left housing 2 and PDA support wire 17 is rotatably mounted into PDA support 16. Key membrane cable 8, which transmits electrical signals from the keyswitches 19, is connected to the left key assembly 7 and the right key assembly 6. PCB membrane cable 9, which transmits electrical signals from the keyswitches 19 to the PCB 10, is connected to left key assembly 7. PCB 10 is affixed to left housing 2 and it is held in place by PCB housing 11 through the use of screws 15. PDA membrane cable 12 is connected to left key assembly 7 and to PDA connector 13, which is mounted inside of PDA connector holder 14. PDA connector holder 14 is rotatably mounted in PCB housing 11.

A PDA or other portable microprocessor based equipment can be connected to the keyboard through the use of PDA connector 13. When a PDA is connected to the keyboard, PDA support 16 should be positioned in its extended position as shown in FIG. 5 and PDA support wire 17 should be rotated to its upright position as shown in FIG. 1. PDA support wire 17 provides support for the connected PDA and PDA support 16 maintains PDA support wire 17 in its upright position against the weight of the PDA. When a PDA is not connected to the keyboard, PDA support wire 17 should be rotated to its lowered position and PDA support 16 should be positioned in its inserted position as shown in FIG. 3.

FIG. 2 is a top view of the keyboard in its closed condition and FIG. 2A is a side view of the keyboard in its closed condition. The keyboard is closed by folding right housing 1 over left housing 2 or vice versa. Center hinge 4 rotates about left housing 2 and right housing 1 rotates about center hinge 4. Accordingly, in the closed condition, center hinge 4 is perpendicular to both left housing 2 and right housing 1. Locking latch 18 latches onto right housing 1 to securely fasten the two halves of the keyboard together.

FIG. 3 shows a top view of the keyboard in its open non-interlocked position and FIG. 3A shows a side view of the keyboard in its open non-interlocked position. The keyboard is opened by unfolding right housing 1 from left housing 2. Center hinge 4 rotates about left housing 2 and right housing 1 rotates about center hinge 4. Accordingly, in the opened non-interlocked condition, center hinge 4 is in the same plane as and in between left housing 2 and right housing 1. Additionally, the left edge of right hinge plate 3, which is connected to center hinge 4, is coextensive to the left edge of slidable extender portion 21 of right housing 1. The right edge of right hinge plate 3 is inset from the right edge of right housing 1 by a distance at least equal to the length of slidable extender portion 21 of right housing 1.

FIG. 4 shows right hinge plate 3 and it shows the two key membrane cables 8. The key membrane cables 8 have a folded area 22 in the cut out slot of right hinge plate 3. This folded area stores extra cable length to allow sliding of key assembly 6 and right housing 1 into open interlocked position & open non-interlocked position. The amount of fold in the folded area 22 is at its maximum when the keyboard is in its open interlocked position, is at its minimum when the keyboard is in its closed condition, and is intermediate when the keyboard is in its open non-interlocked position.

FIG. 5 shows a top view of the keyboard in its open interlocked position and FIG. 5A shows a side view of the keyboard in its open interlocked position. The keyboard is changed from the open non-interlocked position to the open interlocked position by sliding the right housing 1 and the left housing 2 together. Slidable extender portion 21 of right housing 1 extends past center hinge 4 and slides over a portion of left housing 2. Additionally, when the two halves of the keyboard are slid together, right hinge plate 3 slides inside right housing 1 such that the right edge of hinge plate 3 is adjacent to the right edge of right housing 1 when the keyboard is in its open interlocked position. Accordingly, the right edge of center hinge 4 is contiguous with the left edge of right key assembly 6, except that the hinge portions of right hinge plate 3 extend between center hinge 4 and right key assembly 6. In the open interlocked position, the keyswitches 19 of the keyboard are in the standard QWERTY configuration and no part of right housing 1 or left housing 2 is not covered by either right key assembly 6 or left key assembly 7.

As shown in FIG. 1, PDA connector 13 is mounted inside PDA connector holder 14 and PDA connector holder 14 is rotatably mounted in PCB housing 11. This rotatable mounting is accomplished by inserting insertion pin 23 of PDA connector holder 14 into opening 24 of PCB housing 11. Insertion pin 23 and opening 24 are manufactured such that they elastically deform when PDA connector 13 and PDA connector holder 14 are pressed down parallel with the top of PCB housing 11, such as happens when the keyboard is placed into its closed position. This elastic deformation causes a resilient force to be applied to the connector holder 14, thereby, causing connector holder 14 and PDA connector 13 to rotate upward (pop up) when the keyboard is opened.

The drawings and descriptions of the preferred embodiment are made by way of example rather than to limit the scope of the inventions, and they are intended to cover, within the spirit and scope of the inventions, all such changes and modifications within the spirit of the invention.

What is claimed is:

1. A portable keyboard comprising
   a first housing;
   a second housing;
   a center hinge plate;
   a first key assembly; and
   a second key assembly wherein
   said first key assembly is mounted to said first housing;
   said second key assembly is mounted to said second housing;
   said center hinge is slidably and rotatably coupled to said first housing;
   said center hinge is rotatably coupled to said second housing;
   said first housing and said second housing can be folded together around said center hinge into a closed position;
   said first housing and said second housing can be unfolded into an open non-interlocked position; and
   said first housing and said second housing can be slid together from said open non-interlocked position into an open interlocked position where said first key assembly is contiguous with said second key assembly.

2. The portable keyboard according to claim 1 further comprising:
   a hinge plate slidably coupled to said first housing and having an end pivotally coupled to said center hinge plate such that;
   when said keyboard is unfolded and said hinge plate is in a first position said first housing and said second housing are in said open non-interlocked position; and
   when said hinge plate is in a second position said first housing and said second housing are in said open interlocked position where said first key assembly is contiguous with said second key assembly.

3. A portable keyboard according to claim 1 further comprising:

a key membrane cable that transmits electrical signals from at least one of the first key assembly and the second key assembly.

4. A portable keyboard according to claim 3 further comprising:

a folded region of the key membrane cable that unfolds when the first housing and the second housing are slid apart.

5. A portable keyboard according to claim 1 further comprising:

a connector that automatically rotates upward when said first housing and said second housing are unfolded.

6. A portable keyboard comprising a first housing having a protrusion extending therefrom;

a second housing;

a housing hinge plate having an elongated opening;

a center hinge plate;

a first key assembly; and a second key assembly wherein said housing hinge plate is inserted inside said first housing such that the protrusion extends through the elongated opening;

said first key assembly is inserted inside said first housing above said hinge plate and affixed to said first housing;

said second key assembly is inserted inside said second housing and affixed to said second housing;

said housing hinge plate is rotatably mounted to said center hinge;

said second housing is rotatably mounted to said center hinge; and said housing hinge plate slides inside said first housing when said first housing and said second housing are slid together.

7. A portable keyboard according to claim 6 further comprising:

a key membrane cable that transmits electrical signals from the first key assembly or the second key assembly.

8. A portable keyboard according to claim 6 further comprising:

a folded region of the key membrane cable that unfolds when the first housing and the second housing are slid apart.

9. A portable keyboard according to claim 5 further comprising:

a connector that automatically rotates upward.

10. A portable keyboard comprising:

a first keyboard portion;

a second keyboard portion; and a center hinge plate for pivotally coupling said first keyboard portion and said second keyboard portion;

wherein said center hinge plate is slidably coupled to one of said first keyboard portion and said second keyboard portion such that said first keyboard portion and said second keyboard portion move between an open non-interlocked position and an open interlocked position where said first keyboard portion and said second keyboard portion are substantially contiguous.

* * * * *